(No Model.)

G. H. HUTTON.
THILL COUPLING.

No. 282,457. Patented July 31, 1883.

Witnesses:
A. E. Eader
John E. Morris.

Inventor:
Geo. H. Hutton
By Chas. B. Mann
Attorney

United States Patent Office.

GEORGE H. HUTTON, OF BALTIMORE, MARYLAND.

THILL-COUPLING.

SPECIFICATION forming part of Letters Patent No. 282,457, dated July 31, 1883.

Application filed April 11, 1883. (No model.)

*To all whom it may concern:*

Be it known that I, GEORGE H. HUTTON, a citizen of the United States, residing at Baltimore, and State of Maryland, have invented certain new and useful Improvements in Thill-Couplings, of which the following is a specification, reference being had therein to the accompanying drawings.

My invention relates to a certain improvement in thill-couplings, which will first be described, and then designated in the claim.

Figure 1:
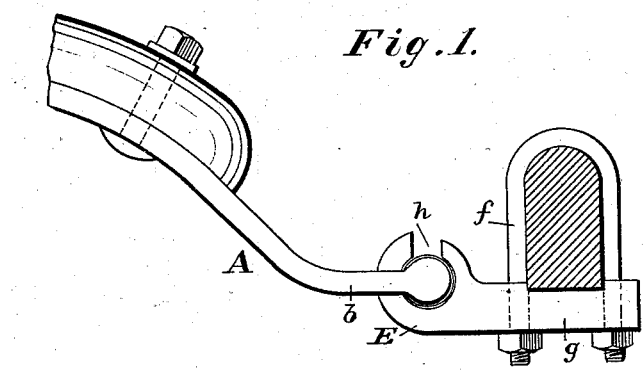
Figure 2:
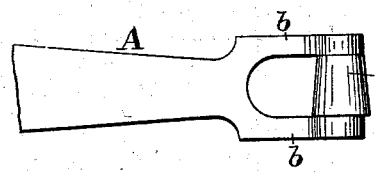
Figure 3:
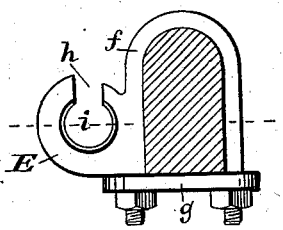
Figure 4:
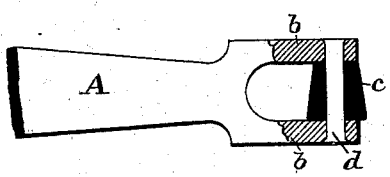
Figure 5:
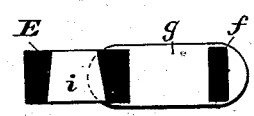

In the drawings hereto annexed, Figure 1 is a side view. Fig. 2 is a view of the thill-iron separate. Fig. 3 is a view showing the socket or hook integral with the clip. Fig. 4 is a view of the thill-iron in section. Fig. 5 is a view, also in section, of the socketed clip.

The design of this invention is to provide a link-headed or cylindrical-headed thill-iron which engages, by a lateral movement with a socket or hook, with a tapered or cone-shaped head or cross-bar, and the circular socket with a tapered bore.

In manufacturing the thill-iron A two limbs or ears, *b*, are formed by forging, and a cone-shaped cross bar or head, *c*, is made of cast-steel, hardened and cored out or bored endwise for the passage of the pin *d*, the ends of which are secured in the limbs or ears by riveting firmly, so as to permanently attach the tapered or cone-shaped head between the limbs or ears of the iron. The circular socket or hook E may be integral with the clip *f*, or may be part of the plate *g*, which is secured under the axle by the clip. Both forms are shown in the drawings. A slot, *h*, extends crosswise of the upper side of the circular socket, and it is this which gives it the form of a hook. The socket has a tapered bore, *i*, as shown plainly in Fig. 5, which corresponds to the taper of the cone-shaped head. This tapered bore in the slotted socket and the cone-shaped head on the thill-iron constitute the essential feature of my invention. By this feature the two parts, when coupled together, fit snugly, and thus prevents rattle; and while they are adapted to fit together closely, they may also be easily and readily coupled, because—as this style of coupling is effected by holding the shafts up vertically and passing one of the limbs or ears *b* of the iron sidewise through the slot *h*, in order thereby to insert the head *c* into the bore of the socket—the small end of the cone-shaped head may be entered at the side of the socket where the bore is largest. The result, as just stated, is that there is no difficulty at all in effecting the coupling. It will thus be seen the feature referred to gives a great advantage over a straight cylindrical head and a socket with a straight bore. This coupling, of course, may be used on both shafts and tongues.

Having described my invention, I claim and desire to secure by Letters Patent of the United States—

A thill-coupling having on one part a circular-slotted socket with a tapered bore, *i*, and on the other two limbs or ears, *b*, with a cone-shaped head, *c*, secured between them, as and for the purpose set forth.

In testimony whereof I affix my signature in presence of two witnesses.

GEO. H. HUTTON.

Witnesses:
 JNO. T. MADDOX,
 JOHN E. MORRIS.